(12) United States Patent
Nicolini

(10) Patent No.: US 7,322,276 B2
(45) Date of Patent: Jan. 29, 2008

(54) COFFEE DISPENSER GROUP, IN PARTICULAR FOR ESPRESSO COFFEE, FOR A DRINKS MACHINE

(75) Inventor: Antonio Nicolini, Schio (IT)

(73) Assignee: Officine Meccaniche Manea S.r.l., Zane Vicenza (IT)

( * ) Notice: Subject to any disclaimer, the term of this patent is extended or adjusted under 35 U.S.C. 154(b) by 0 days.

(21) Appl. No.: 11/075,014

(22) Filed: Mar. 8, 2005

(65) Prior Publication Data

US 2005/0199128 A1    Sep. 15, 2005

(30) Foreign Application Priority Data

Mar. 11, 2004  (IT)  ............................ MI2004A0463

(51) Int. Cl.
*A47J 31/00*   (2006.01)
(52) U.S. Cl. .................................. 99/289 R; 99/302 P
(58) Field of Classification Search ............... 99/279, 99/323, 288–303, 495; 100/73, 131, 244
See application file for complete search history.

(56) References Cited

U.S. PATENT DOCUMENTS

| | | | | |
|---|---|---|---|---|
| 3,221,857 A | * | 12/1965 | Keller | 193/46 |
| 3,760,712 A | * | 9/1973 | Rossi | 99/289 R |
| 4,271,752 A | * | 6/1981 | Valente et al. | 99/289 R |
| 4,681,028 A | | 7/1987 | Schmed et al. | |
| 5,255,594 A | * | 10/1993 | Grossi | 99/287 |
| 5,259,296 A | * | 11/1993 | Mikael et al. | 99/280 |
| 5,492,054 A | * | 2/1996 | Schneeberger | 99/289 R |
| 5,722,313 A | * | 3/1998 | Schmed | 99/289 R |
| 6,253,664 B1 | * | 7/2001 | Giannelli | 99/302 P |
| 6,786,134 B2 | * | 9/2004 | Green | 99/289 P |
| 6,827,003 B2 | * | 12/2004 | Versini | 99/287 |

FOREIGN PATENT DOCUMENTS

| | | | |
|---|---|---|---|
| EP | 1306041 A1 | * | 5/2003 |
| ES | 2156668 | | 7/2001 |
| FR | 2424 010 A1 | | 11/1979 |

OTHER PUBLICATIONS

European Search Report, May 2, 2007.

* cited by examiner

*Primary Examiner*—Timothy F. Simone
(74) *Attorney, Agent, or Firm*—Hedman & Costigan PC; James V. Costigan

(57) ABSTRACT

A coffee dispenser group, in particular for espresso coffee, for a drinks machine comprises two shoulders (62) connected together by two sealing blocks (63) arranged at the bottom and an upper brewing cylinder (64) arranged on top. Said shoulders have guide and sliding runs (65) for a mobile lower brewing device (66), said lower brewing device (66) being equipped with a plunger (69) that can slide inside it guided by a first lever (70) through a slot (71) formed in the lever itself and the lower brewing device (66) being connected to an actuation linkage to be driven from an initial position for feeding the ground coffee to a brewing position engaged with the upper brewing cylinder (64).

6 Claims, 4 Drawing Sheets

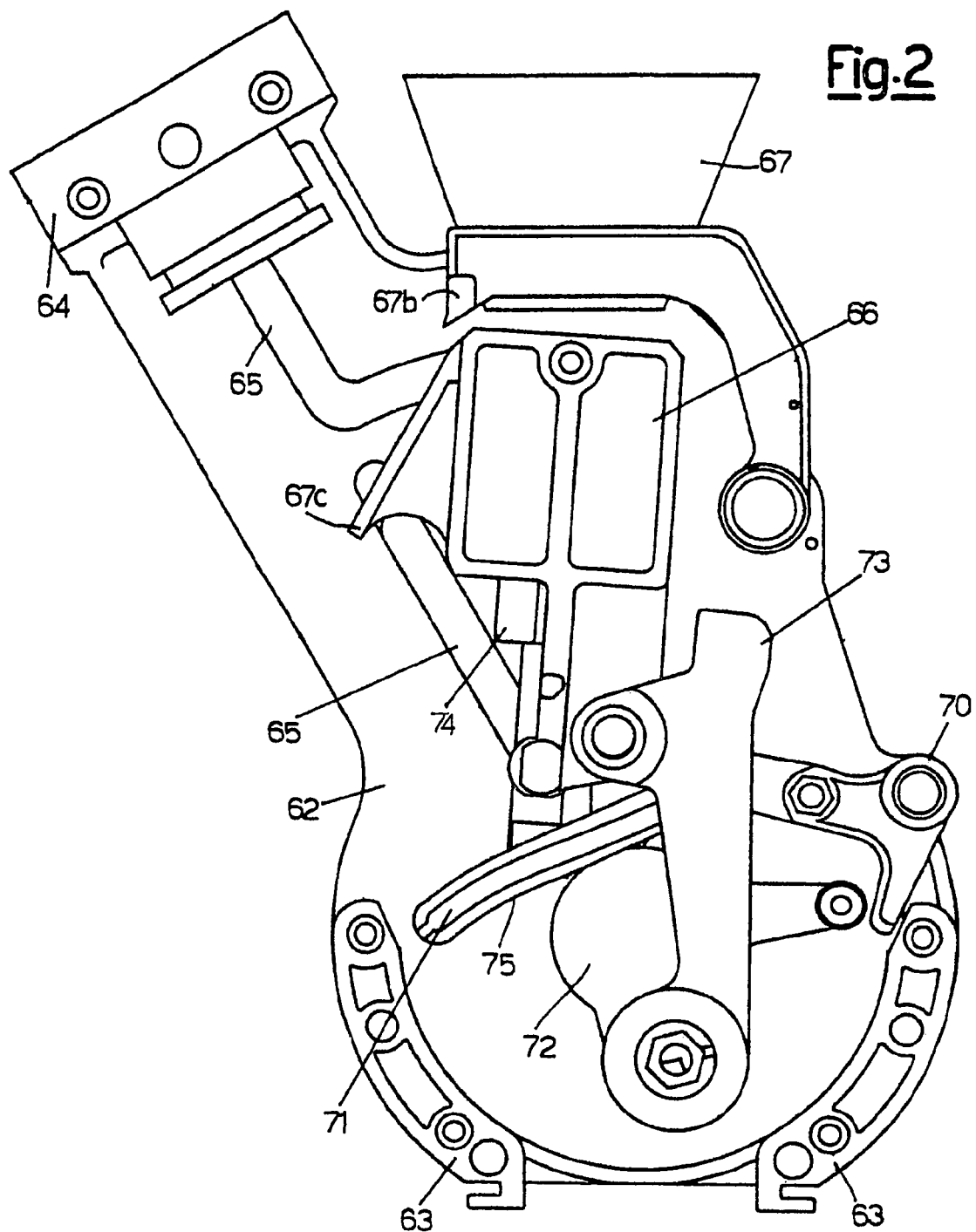

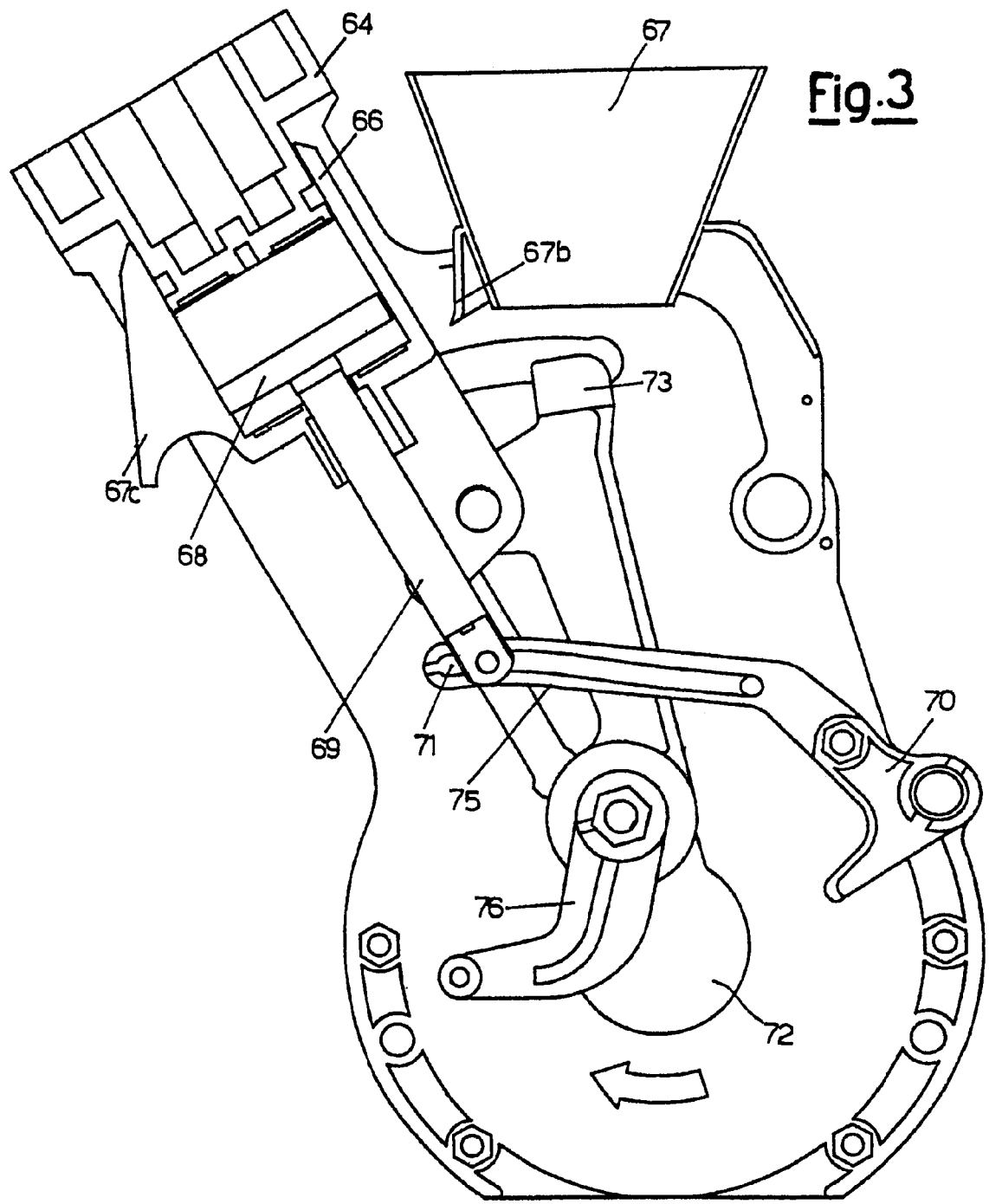

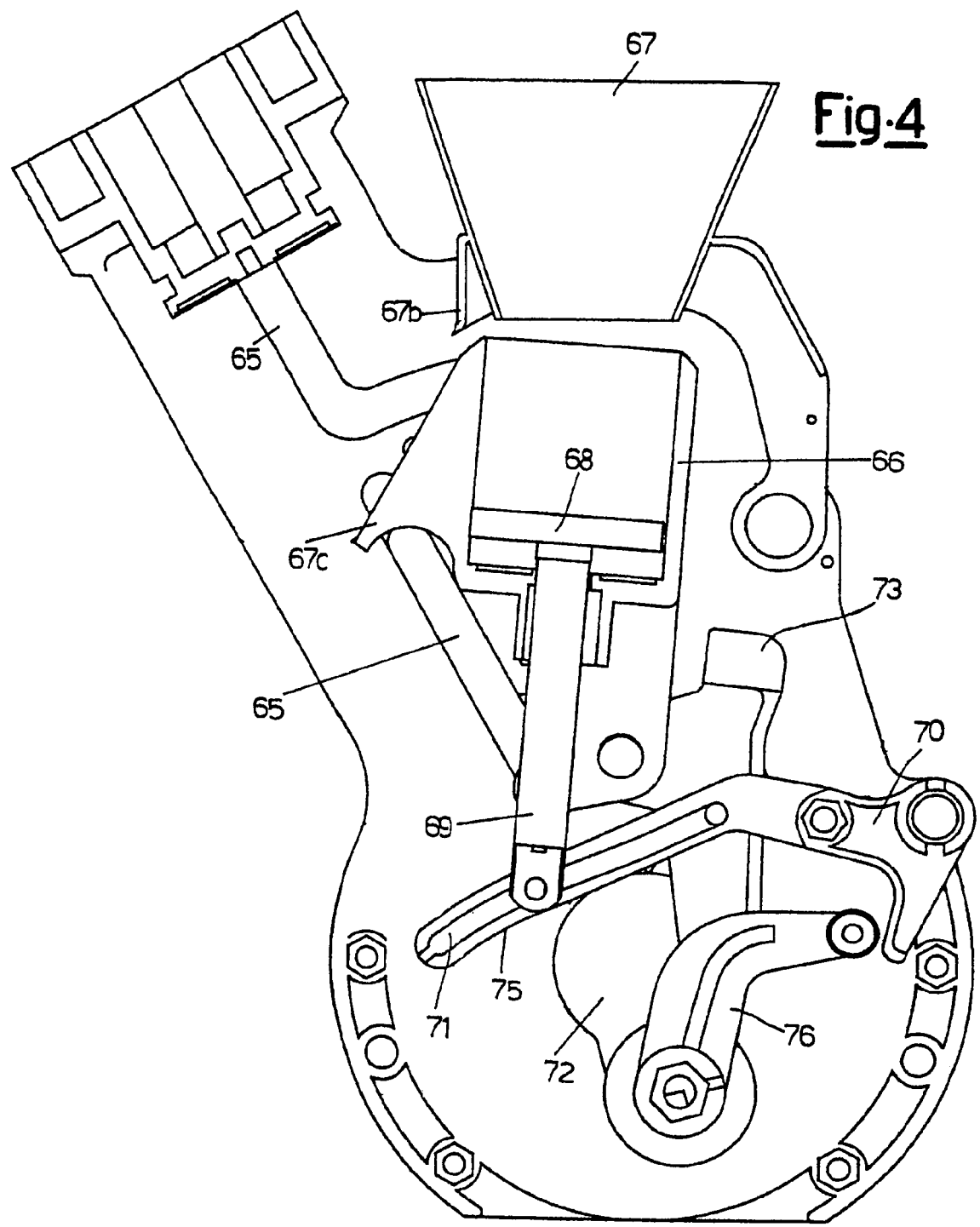

COFFEE DISPENSER GROUP, IN PARTICULAR FOR ESPRESSO COFFEE, FOR A DRINKS MACHINE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1. Field of the Invention

The present invention refers to a coffee dispenser group for a drinks machine.

In particular, the invention refers to an espresso coffee dispenser group.

Automatic drinks machines that, in various forms, allow the user to interact to order and personalise drinks are currently known and widely used.

2. Description of Related Art

Modern machines can be considered to consist of different functional blocks or groups.

For example, the container group for solubles, the cup container group, the drinks group (coffee, tea, milk and the like), and the accessory group are commonly installed.

Amongst the various functional groups, the espresso coffee group is generally particularly complex in terms of its components, and its integration in the machine obliges rather onerous structural choices both in terms of bulk and in terms of cost.

The general purpose of the present invention is that of making a coffee dispenser group, in particular for espresso coffee, for a drinks machine with a reduced number of components that is cost-effective to make and that has low bulk.

BRIEF SUMMARY OF THE INVENTION

In view of the aforementioned purpose, according to the present invention, it has been thought of to make a coffee dispenser group in particular for espresso coffee, for a drink machine, having a structure comprising two shoulders (62) connected together by two sealing blocks (63) arranged at the bottom and an upper brewing cylinder (64) arranged on top, said shoulders having guide and sliding runs (65) for a mobile lower brewing device (66), said lower brewing device (66) being equipped with a plunger (69) that can slide inside it guided by a first lever (70) through a slot (71) formed in the lever itself and the lower brewing device (66) being connected to a actuation linkage to be driven from an initial position for feeding the ground coffee to a brewing position engaged with the upper brewing cylinder (64).

BRIEF DESCRIPTION OF THE SEVERAL VIEWS OF THE DRAWINGS

The structural and functional characteristics of the present invention and its advantages compared to the prior art shall become clearer from an examination of the following description, referring to the attached schematic drawings, in which:

FIGS. 2 to 4 show a partial section view of the group in different operating positions.

DETAILED DESCRIPTION OF THE INVENTION

Figure 1:
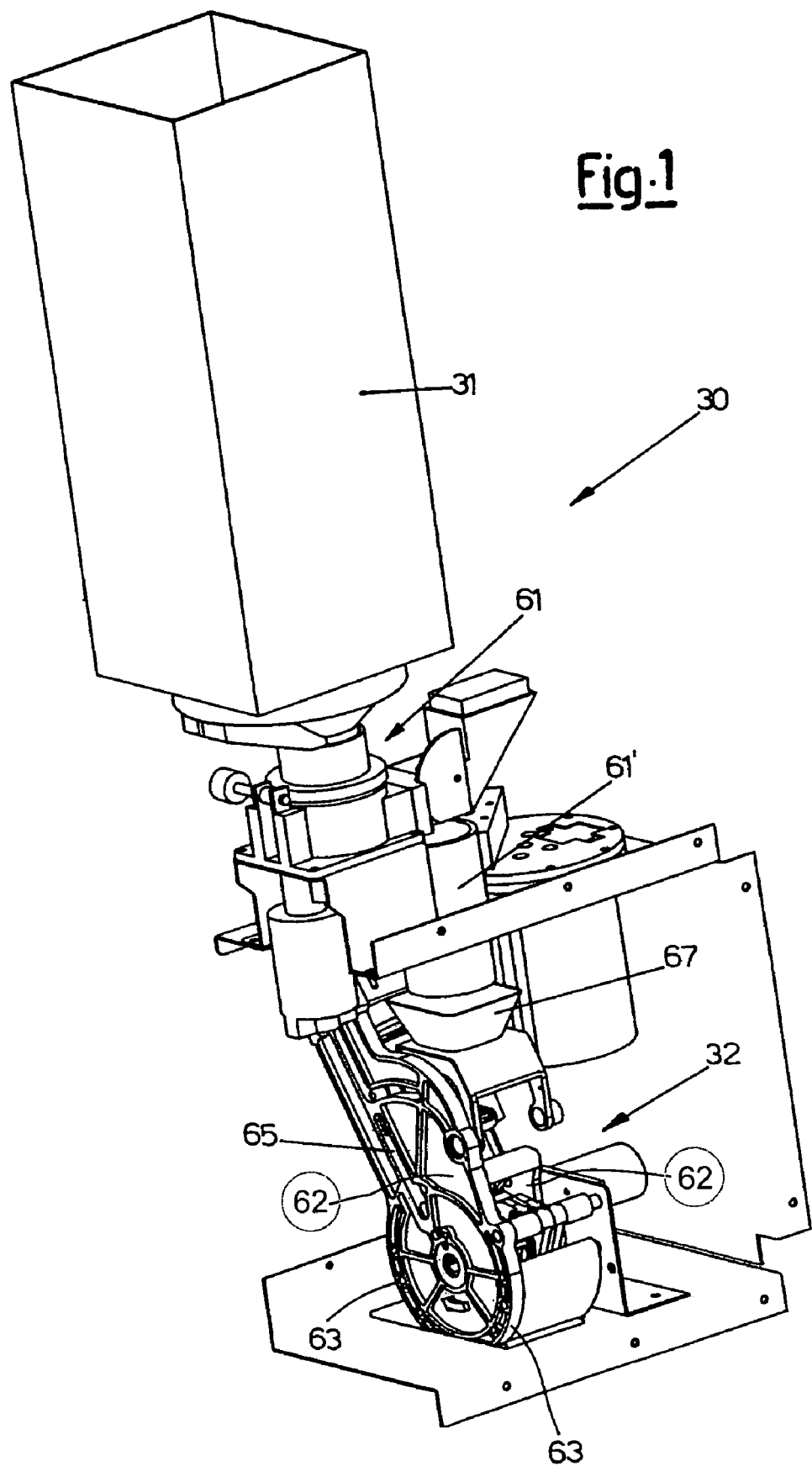
FIG. 1 is a perspective section view of the group according to the invention.

With reference to the figures, a coffee dispenser group 30, in particular for espresso coffee, is illustrated comprising a mechanism made from plastic for food products positioned under a coffee grain container 31 equipped with a grinder 61 and doser 61', arranged in cascade under said container.

The movement of the group is carried out thanks to an outer motor reducer 32 that, with direct transmission, places an assembly of levers and linkages in rotation.

The group comprises two shoulders 62 connected together by two sealing blocks 63 arranged at the bottom and an upper brewing cylinder 64 arranged on top.

In the shoulders 62 guide and sliding runs 65 have been formed for a mobile lower brewing device 66.

In the rest position illustrated in FIG. 2, a funnel 67, arranged under the doser 61' of the coffee grinder 61, conveys the ground coffee into the mobile lower brewing device 66.

The ground coffee is deposited on a microfilter 68 fixed onto a plunger 69 that is perforated at the bottom to allow the subsequent passage of water to brew the coffee.

The plunger 69 slides inside the lower brewer and is guided by a first lever 70 through a slot 71 formed in the lever itself.

The actuation linkage foresees two side connecting rods 72 and a shaft 73 on which the lower brewing device 66 is hinged.

Through the rotation of one of the two side connecting rods 72 engaged with the motor, the lower brewing device 66 is driven guided by the runs 65, upwards until it engages with the upper brewing cylinder 64.

In this position the previously set amount of hot water, necessary to form the coffee brew passing through the ground coffee pressed on the microfilter 68, is introduced through the upper brewing cylinder 64.

The coffee brew comes out from the lower brewing device 66 through a spout 74 to which a flexible duct is connected, preferably a silicon tube.

At the end of this operation in which the whole of the brewing device has remained still in the upper part of the dispenser group, the motor is restarted to take the components to the starting point.

During this step the tablet or block formed from the used ground coffee powder, which cannot be reused, is discharged.

The first lever 70 that moves the plunger 69 has a cam-shaped profile 75 in its bottom part.

During this second step, a roller, foreseen at the end of a second lever 76 that is engaged between the two side connecting rods 72, comes into contact with the cam 75. Its task is that of guiding the movement of the first lever 70 and therefore the position of the plunger 69 during the cycle.

The perfect synchronisation of the return movement of the lower brewing device 66 and of the movement of the first lever 70 guided by the second lever 76 moves the plunger in such a way that during the return to the starting position, it is positioned for a few degrees in the highest position of the lower brewing device 66 making the tablet of used coffee project into the high part thereof.

The lower brewing device 66, guided by the run 65 formed on the shoulders 62, shall pass under the part of the funnel 67 that is equipped with a projection 67*b* that is suitably shaped to carry out the scraper function.

The projection 67*b* takes care of discharging the used tablet making it slide on the inclined part of an inclined plane 67*c* towards the outside of the group and repositioning itself under the funnel in the starting position to be ready for the next cycle.

From that which has been described above with reference to the figures, it is clear how a coffee dispenser group, in particular for espresso coffee, for a drinks machine according to the invention is particularly useful and advantageous. The purposes mentioned in the preamble of the description are thus achieved.

Of course, the shapes of the coffee dispenser group, in particular for espresso coffee, of the invention can be different from the one shown merely as a non-limiting example in the drawings.

The scope of protection is therefore defined by the attached claims.

The invention claimed is:

1. Coffee dispenser group, for an espresso coffee drink machine, comprising two shoulders (62) connected together by two sealing blocks (63) arranged at a bottom of said machine and an upper brewing cylinder (64) arranged on top of said machine, said shoulders having guide and sliding runs (65) for a mobile lower brewing device (66), said lower brewing device (66) being equipped with a plunger (69) that can slide inside it guided by a first lever (70) through a slot (71) formed in said first lever itself and the mobile lower brewing device (66) being connected to an actuation linkage to be driven from an initial position for feeding the ground coffee to a brewing position engaged with the upper brewing cylinder (64) wherein said actuation linkage comprises a shaft (73) on which said mobile lower brewing device (66) is hinged, and a side connecting rod (72) is engaged with a motor, so that the mobile lower brewing device (66) is driven upwards guided by the sliding runs (65), until it engages with said upper brewing cylinder (64) said dispenser group also including a funnel (67) equipped with a projection (67*b*) that is suitably configured to carry out the function of a scraper is positioned so that the mobile lower brewing device (66), guided in the run (65) formed on the shoulders (62), passes under a part of said funnel (67) to discharge the used coffee on said microfilter, said mobile lower brewing device (66) also having attached thereto an inclined plane (67*c*) facing towards the outside of the machine and suitable for receiving said coffee on said microfilter to be discharged.

2. Coffee dispenser group according to claim 1, wherein said plunger (69) is equipped with a microfilter (68) on which the ground coffee is deposited, and said microfilter being perforated at the bottom to allow the subsequent passage of water to brew coffee.

3. Coffee dispenser group according to claim 2, wherein a previously set amount of hot water, necessary to form the coffee brew passing through the ground coffee pressed on the microfilter filter (68), is introduced through an opening of an electrovalve and through the upper brewing cylinder (64).

4. Coffee dispenser group according to claim 3, having a spout (74) connected to said mobile lower brewing device (66), and to which a flexible silicon tube is connected, to allow the brewed coffee brew to come out.

5. Coffee dispenser group according to claim 4, wherein said first lever (70) that moves the plunger (69) has a cam-shaped profile (75) in its bottom part.

6. Coffee dispenser group according to claim 5, wherein a second lever (76) is engaged between the two side connecting rods (72) and having a roller at the end suitable for making contact with said cam-shaped profile (75) to guide the movement of the first lever (70) and the position of the plunger (69) during a brewing cycle.

* * * * *